UNITED STATES PATENT OFFICE.

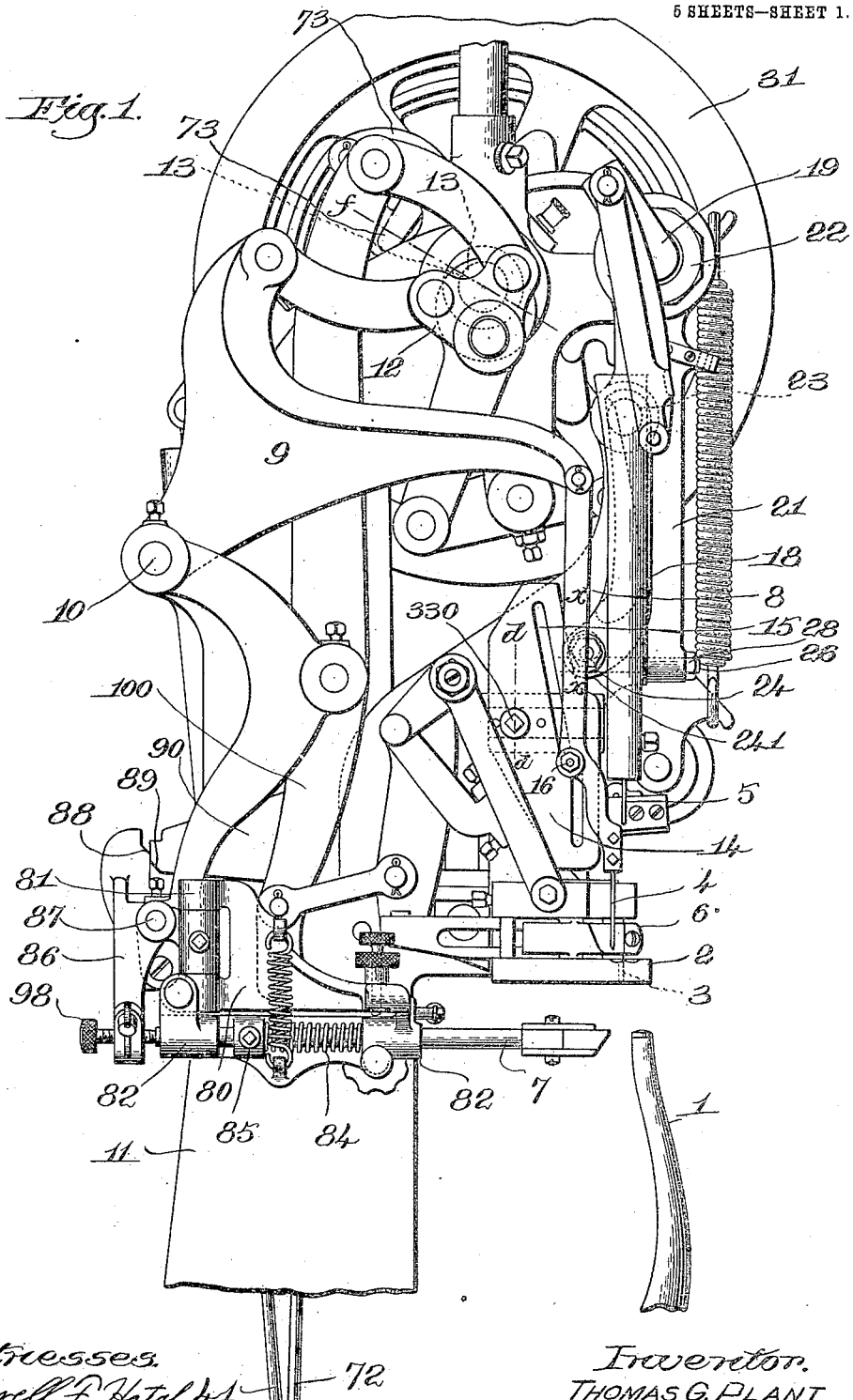

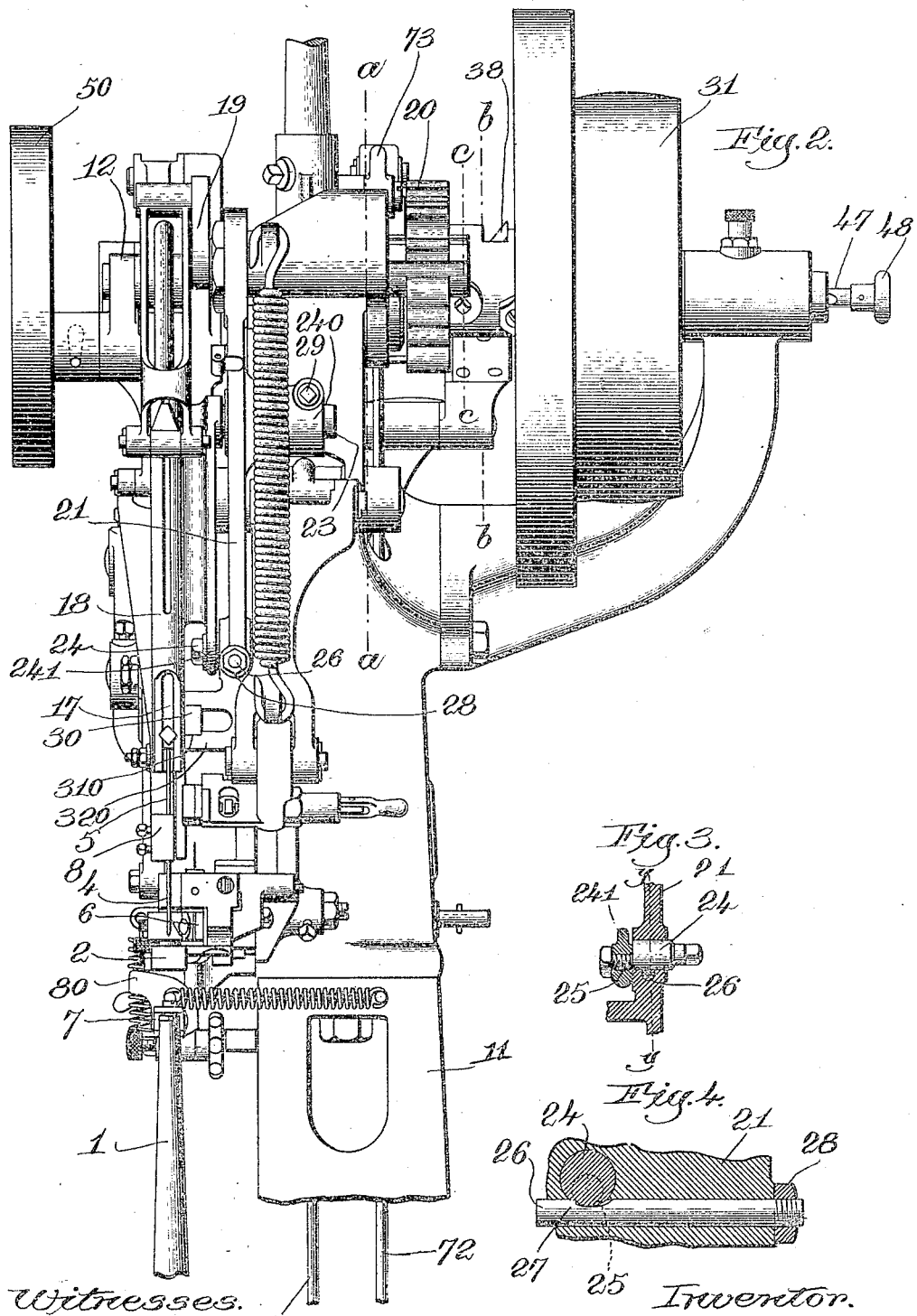

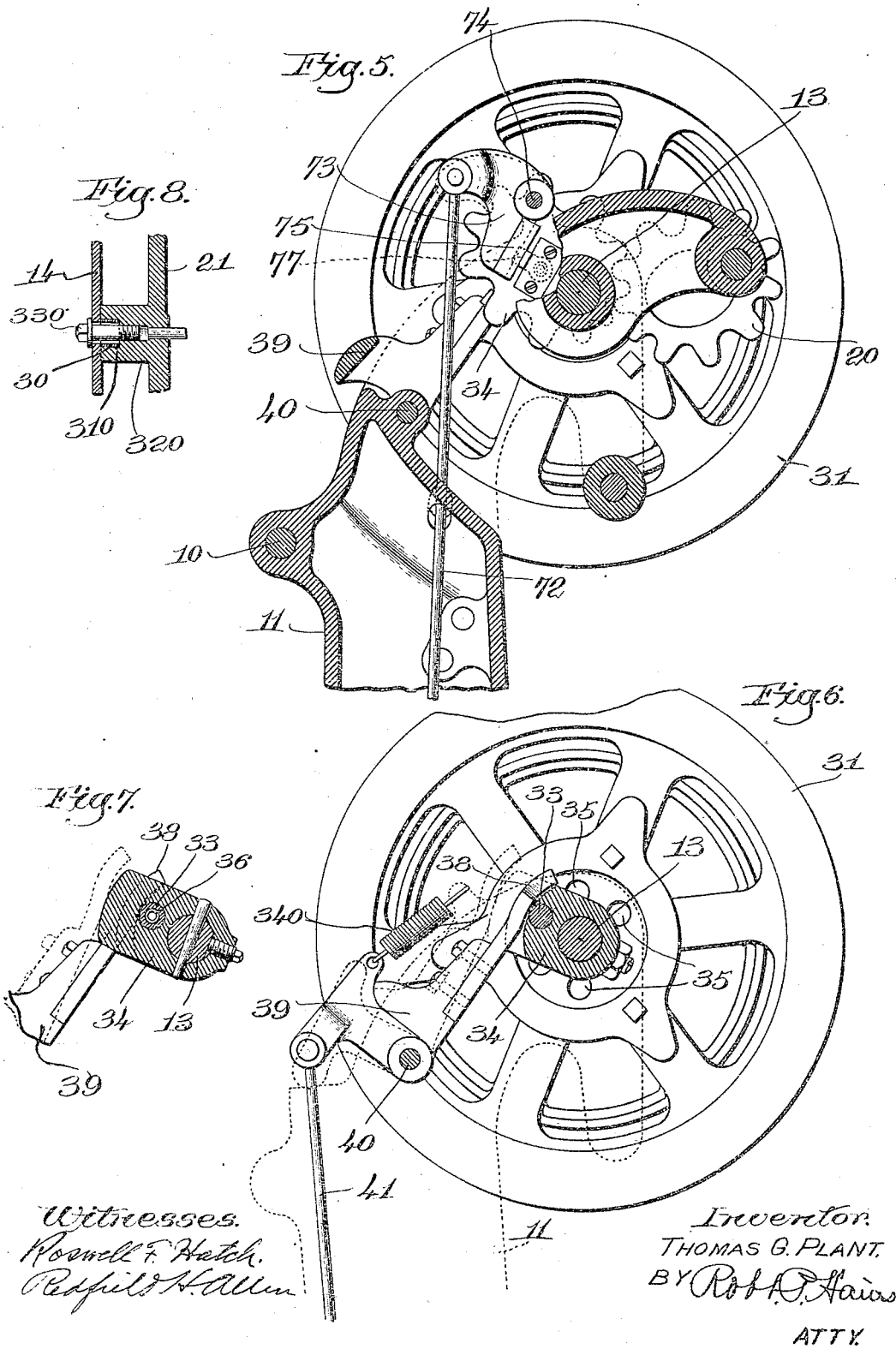

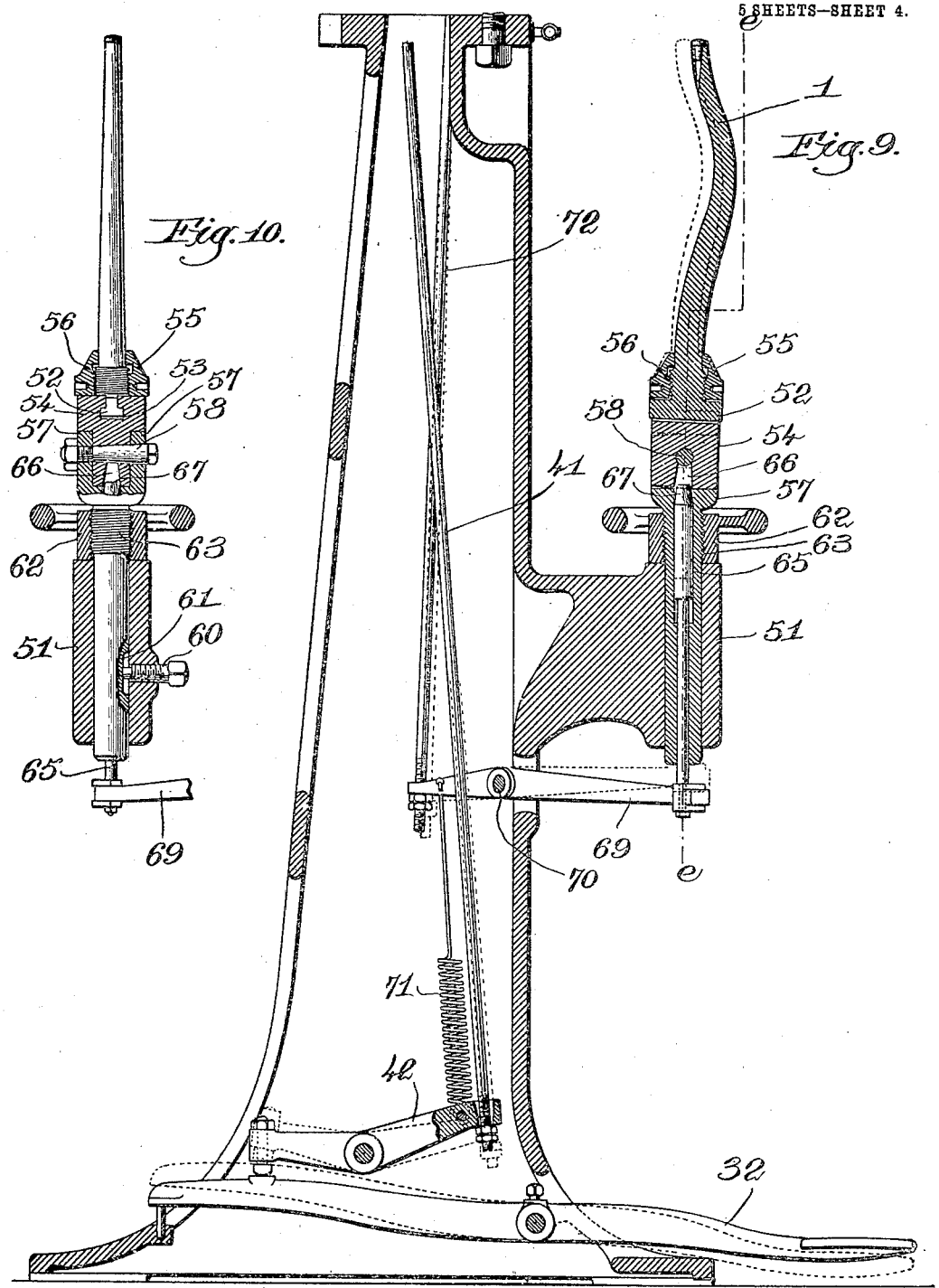

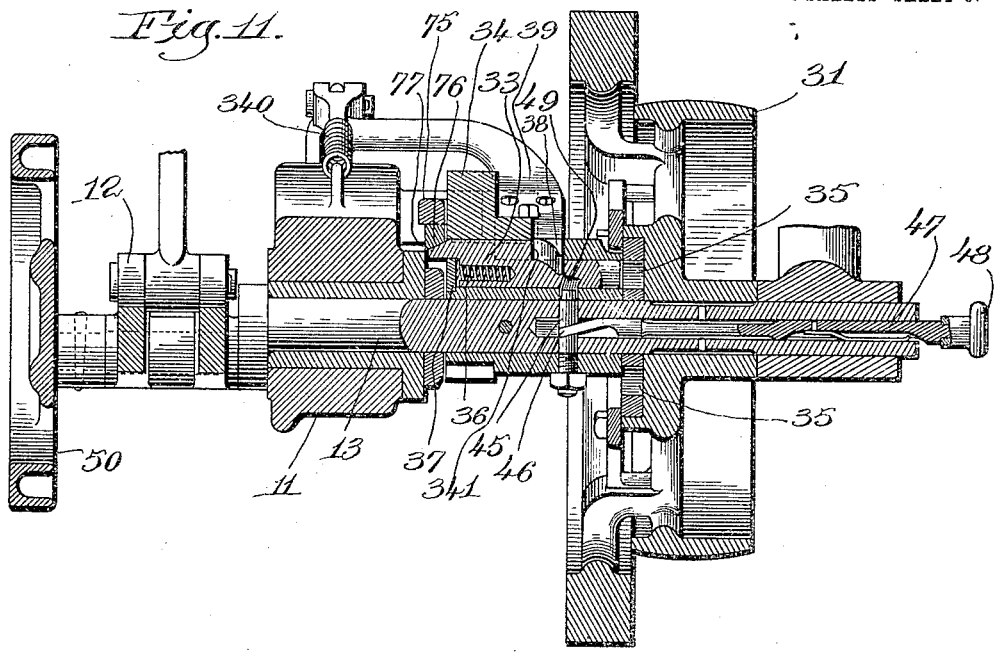

THOMAS G. PLANT, OF BOSTON, MASSACHUSETTS.

MACHINE FOR INSERTING METALLIC FASTENINGS.

958,293. Specification of Letters Patent. Patented May 17, 1910.

Application filed January 31, 1908, Serial No. 413,540. Renewed November 22, 1909. Serial No. 529,301.

*To all whom it may concern:*

Be it known that I, THOMAS G. PLANT, a citizen of the United States, residing at Boston, in the county of Suffolk and State of Massachusetts, have invented an Improvement in Machines for Inserting Metallic Fastenings, of which the following description, in connection with the accompanying drawings, is a specification, like numerals on the drawings representing like parts.

This invention relates to machines for inserting metallic fastenings into leather, and especially to so-called "heel-seat nailers" employed in the manufacture of boots and shoes to secure the heel-seat portion of the sole, the upper, the counter, the lining and the inner sole firmly together. Machines of this class usually comprise a horn or rest on which the work is supported, an awl, means to drive the fastening, and feeding means to feed the work as the fastenings are driven. In some machines of this class the horn is pivotally mounted so that it can be swung back from the feed-bar when the machine is at rest for the purpose of affording more room between the horn and the feed-bar for the removal of the work from and the replacing of it on the horn.

My present invention relates particularly to a machine wherein the horn is thus pivotally mounted and the invention comprehends a novel means for locking the horn in its operative position while the machine is in operation and releasing or unlocking the horn to permit it to be swung back into its inoperative position when the machine is at rest.

The lock for the horn is in my present invention controlled from the main shaft and especially from the clutch which is used to clutch the driving pulley to the main shaft, the device being so arranged that the operation of engaging the clutch results in locking the horn in operative position and the operation of disengaging the clutch results in releasing the horn.

My invention also comprehends other features of improvement relating to the various parts of the machine to secure a more perfect action, all as will be more fully hereinafter described.

One embodiment of my invention will first be described and then the novel features thereof pointed out in the appended claims.

In the drawings Figure 1 is a side view of a machine embodying my invention; Fig. 2 is a front view thereof; Fig. 3 is a section on the line $x$—$x$, Fig. 1; Fig. 4 is an enlarged section on the line $y$—$y$, Fig. 3; Fig. 5 is a section on the line $a$—$a$, Fig. 2; Fig. 6 is a section on the line $b$—$b$, Fig. 2; Fig. 7 is a section on the line $c$—$c$, Fig. 2; Fig. 8 is a section on the line $d$—$d$, Fig. 1; Fig. 9 is a vertical section through the horn and the lower end of the standard; Fig. 10 is a section on the line $e$—$e$, Fig. 9. Figs. 11 and 12 are sections on line $f$—$f$, Fig. 1, Fig. 11 showing the clutch disengaged and Fig. 12 showing the clutch engaged; Fig. 13 is a section on line $g$—$g$, Fig. 12.

The machine comprises in its construction the usual horn 1 on which the work is supported, the work-plate 2 against which the work is held and which has the usual hole 3 therein through which the fastening is driven, the awl 4 for puncturing the stock, the driver 5 for driving the fastening, the swinging nail carrier 6 which by its swinging movement operates to cut a length from the wire from which the fastenings are made and carry such severed length over the aperture 3 so that when the driver descends the fastening will be driven into the stock, and the feed-bar 7 which acts against the shoe and gives the latter its feeding movement. All these various parts are operated from the main shaft 13 which is journaled in the standard 11. The awl 4 is carried by the awl-bar 8 which is pivoted at its upper end to a lever 9 that in turn is pivoted at 10 to the frame or standard 11 and is actuated in usual manner by a crank or eccentric 12 on said main shaft 13. Said awl-bar is guided in its reciprocation by the usual cam-plate 14 which has the cam slot 15 therein in which is received a pin 16 carried by the awl-bar. The driver 5 is carried by the usual driver-bar 17 which works in a driver-bar guide 18, said driver being actuated by a crank shaft 19 which is rotated from the main shaft 13 by means of the usual eccentric gears 20 and 34, the gear 34 being fast to the main shaft. The work-plate 2 is sustained in usual manner by the apron 21, which is hung from the bearing 22 for the crank shaft 19. The bearing 22 has an oscillating movement during the rotation of the crank shaft 19, and the apron has a slight up and down movement, all as usual in machines of this class. The parts thus far described are or may be all as usual in machines of this class and form no part of my invention; and as the operation of a machine such as herein illustrated is familiar to those skilled in the art, I do not deem it necessary to enter into a detailed description of all the parts thereof.

In machines of this class as heretofore constructed it has been customary to secure the guide 18 for the driver-bar fixedly to the frame or standard 11. In this invention, I have mounted said guide 18 on the apron 21 so that said guide moves up and down with the apron. I have also provided a novel means of adjusting the guide so as to accurately aline the driver with the hole in the nail-carrier 6. Said guide is provided at its upper end with a pin or stud 23 which is received in a suitable bearing 240 extending from the apron, and the lower end of said guide is provided with an arm 241 through which extends a bolt or pin 24 which is secured to the apron (see Fig. 3).

The desired adjustment of the guide toward and from the front of the machine is secured by making the portion 25 of the bolt 24 which passes through the arm 241 eccentric, as shown in Fig. 3, so that by turning the bolt in the apron the guide 18 can be adjusted toward and from the front of the machine. This bolt 24 is locked in its adjusted position by means of a locking pin 26 which is mounted in the apron 21, as shown in Fig. 4, and is provided with a wedge portion 27 situated to engage the body of the bolt 24. The exposed end of the bolt has a nut 28 screw-threaded thereon, and by tightening the nut the wedge portion 27 of the locking pin is drawn against the bolt 24 thereby to lock it against movement, as clearly shown in Fig. 4. Lateral adjustment of the driver-bar guide can be effected by shifting the pin 23 and bolt 24 longitudinally in their bearings. The bearing 240 is split and the guide is held longitudinally in its adjusted position by means of the clamping screw 29 which is situated in the bearing and tightens the latter about the pin 23. One advantage of supporting the guide on the apron is that the guide has an up and down movement with the apron and the wear between the guide and driver is thus reduced. The cam-plate 14 is also made adjustable so that the awl may be properly lined up as wear occurs. In this invention this adjustment of the cam-plate is provided by making said plate with the rib 30 which slides horizontally in ways 310 formed in a projection 320 extending from the apron. The plate is held in its adjusted position by a clamping screw 330 which extends through a slot in the cam-plate 14 and screws solidly into the apron. By loosening the screw 330 the cam-plate can be adjusted toward and from the front of the machine and when in its adjusted position it may be firmly held by tightening the screw 330. This method of adjustment maintains the cam-plate always in proper vertical position while permitting its adjustment toward and from the front of the machine.

The main shaft 13 is driven from a driving pulley 31 which is adapted to be clutched to said shaft 13 by a clutch that is controlled by a treadle 32. This clutch comprises a clutch pin 33 (see Figs. 11 and 12) which is slidably mounted in the hub of the eccentric gear 34 that is fast to the main shaft, and which is adapted to engage in any one of a number of apertures or recesses 35 formed in the driving pulley. Said pin is thrown into clutching engagement with the driving pulley 31 by a spring 36 which is shown as set in a recess formed in the clutch pin 33 and as backed by a plate 37 which is secured to the side of the gear 34. Said spring, therefore, normally tends to move the clutch pin to the right Figs. 11 and 12 into engagement with the driving pulley. Said clutch pin is disengaged from the driving pulley when it is desired to release the clutch by means of a wedge-shaped finger 38 that is carried by a rocking member 39 pivoted to the standard at 40. Said rocking member is normally held in the full line position Fig. 6 by means of a spring 340 which is secured at one end to said member and at the other end to the standard 11, and the clutch pin 33 is shaped to present a shoulder 341 which is adapted to engage the wedge-shaped finger 38 as the shaft rotates, whereby the pin is crowded toward the left Figs. 11 and 12 and thereby disengaged from the driving pulley. This disengagement of the clutch occurs at the end of the cycle of operations. The rocking member 39 is controlled by a treadle 32, said treadle having engagement with and operating a lever 42 which is connected by a rod 41 with the rocking member 39.

The clutch is thrown into operation by depressing the treadle 32, thereby to rock the member 39 into the dotted line positions Figs. 6 and 7, and withdraw the finger 38 from engagement with the clutch pin 33 and allow the latter to be thrown into engagement with the driving pulley by the spring 36. The clutch as thus far described is similar to that commonly used on machines of this class.

The horn 1 is supported as usual upon an arm 51 extending from the column or standard 11. Said horn is mounted so that it can be adjusted toward and from the front of the machine, and for this purpose, it is provided with the dove-tailed foot 52 which is received in a correspondingly-shaped groove 53 formed in a head 54, this construction permitting the horn to be adjusted in the groove. Said horn is held in its adjusted position by a clamping collar pulley so that the machine may be turned by hand and the treadle manipulated in the usual way without causing the driving pulley to be thrown into clutching engagement with the driving shaft. This is provided in my present embodiment by means of a locking pin 45 which is mounted in the main shaft 13 and extends transversely thereof and which is adapted to be projected laterally into a locking recess 49 formed in the clutch pin 33. The locking pin 45 is given its movement by means of a sliding actuator 47 that is fitted within an axial bore formed in the end of the main shaft 13, as seen in Figs. 11 and 12. The inner end 46 of the actuator is forked and is formed at an angle to the length of the actuator, the arms of the forked end of the actuator being received in slots formed in the locking pin 45. When the recess 49 in the clutch pin 33 is in alinement with the locking pin 45, a movement of the actuator 47 to the left Fig. 11 will throw the locking pin upward and cause the end of it to enter the recess 49 thus locking the clutch pin in its position disengaged from the driving pulley. The parts are so arranged that when the machine is brought to rest, the locking pin stands in proper position to enter the recess 49, as above described. The left-hand end of the driving shaft is provided with a hand wheel 50 by means of which said shaft may be turned manually when the clutch pin is thus locked disengaged from the driving pulley.

The feed-bar 7 is sustained in usual manner in a frame 80 which is pivoted to the column 11 at 81 to swing slightly about a vertical axis. This frame is provided with the usual bearings 82 in which the feed-bar reciprocates. The feed-bar is given its backward movement by the usual spring 84 which surrounds the same and is confined between one of the bearings 82 and a collar 85 on the feed-bar. The forward movement of the feed-bar is accomplished by a rocking lever 86 pivoted to the frame at 87 and having at its lower end an adjusting screw 98 which bears against the feed-bar. This lever 86 is provided at its upper end with the cam surface 88 which is acted upon by the cam surface 89 at the end of the lever 90 which forms a part of the wire-feeding devices which are common to machines of this class and hence need not be described herein.

During the operation of the machine the lever 90 rocks about its pivot and the engagement of the cam surface 89 thereon with the cam surface 88 on the lever 87 causes said lever 87 to rock forwardly thereby moving the feed-bar forwardly. The backward movement of the feed-bar is secured by the action of the spring 84 when during the operation of the machine the outer end of the lever 90 moves upwardly to withdraw the cam surface 89 from the cam surface 88. The lateral movement of the feed-bar is secured in usual way by a cam surface at the lower end of lever 100 which engages a corresponding incline or cam surface on the frame 80. The advantage of this construction is that the parts are compactly arranged and the levers having the cam surfaces thereon do not project appreciably beyond the column.

By manipulating the adjusting screw 98 the position of the feed-bar relative to its operating mechanism can be adjusted.

Having fully described my invention, what I claim as new and desire to secure by Letters Patent is:—

1. In a machine for inserting fastenings, the combination with fastening-driving mechanism, of a clutch to operate said mechanism, a work support movable into and out of operative position, and means controlled by the clutch to prevent the work support from movement while the clutch is in engagement.

2. In a machine for inserting fastenings, the combination with fastening-inserting mechanism, of a clutch to operate said mechanism, a tipping horn or work support, and means controlled by the clutch to lock said horn in operative position while the machine is in operation.

3. In a machine for inserting fastenings, the combination, with fastening driving mechanism, of a clutch to operate said mechanism, mechanism for actuating the clutch, a work support movable into and out of operative position, and means controlled by said clutch independently of its actuating mechanism to prevent the work support from movement while the clutch is in engagement.

4. In a machine for inserting fastenings, the combination, with fastening driving mechanism, of a clutch including a member movable to engage and disengage the same, a work support movable into and out of operative position, and means actuated by said movable member to permit the work support to be held from movement while the clutch is in engagement.

5. In a machine for inserting fastenings, the combination with fastening-inserting mechanism and a clutch to operate said mechanism, of a tipping work support having a recess, a locking pin to enter said recess and maintain the work support in operative position, and means associated with said clutch to control the operation of the locking pin.

6. In a machine for inserting fastenings, the combination with fastening-inserting mechanism and a clutch to operate said mechanism, of a tipping work support having a recess, a spring-actuated locking pin 55 which is screwed thereto as at 56, and which serves to firmly clamp the foot 52 to the head. Said horn is also pivotally mounted so that it can be swung from its operative position shown in dotted lines Fig. 9 into its inoperative position shown in full lines. The purpose of making the horn thus adjustable is to permit it to be swung away from the feed-bar when the machine is not in operation so that more room will be afforded for the removal of the work from and the placing of it on the horn. This feature of pivotally mounting the horn is not new with me as machines have heretofore been built with such a construction. These machines, however, have been provided with a locking device for locking the horn in its operative position, which locking device is connected to and is operated by the treadle so that when the treadle is depressed for starting the machine, the horn is locked in operative position, while when the treadle is released, the horn is unlocked.

In my invention I have provided a novel construction of locking device for positively securing the horn in its rigid position, which locking device is controlled from the clutch instead of from the treadle.

One advantage of my improvement is that the throwing of the clutch into engagement operates to lock the horn in its operative position, and said horn will remain locked so long as the clutch is in clutching engagement and will be unlocked only when the clutch is disengaged and the machine is stopped.

Referring now to the details of the construction herein illustrated for accomplishing this result, it will be seen that the pivotal mounting of the horn is secured by providing the head 54 with a tongue which is received between two side pieces 57 of a support and which is pivoted to said side pieces by means of the pivotal pin 58. The support 57 is provided with a shank which is received within the arm 51, said shank being held from turning movement and also being clamped in vertical position by means of a clamping screw 60, the end of which is received in a slot or groove 61 formed in the shank. The support 57 may be adjusted vertically by means of the hand wheel 62 which is screw-threaded to the shank, as at 63, and which rests on the arm 51. This construction permits the horn to be swung about the pivotal pin 58 from its inoperative to its operative position, as will be obvious.

The horn is locked in its operative position by a locking pin 65 which is slidable vertically within the shank of the support 57 and the end 67 of which pin is adapted to be received in a tapered hole 66 formed in the head 54 when the pin is raised, said end of the pin being tapered to fit the hole, as plainly seen in Fig. 9.

As stated above, my invention comprehends means which are controlled by the clutch for actuating and controlling the locking means for the horn, and in the present embodiment mechanism is provided whereby when the clutch pin 33 is disengaged from the driving pulley, the locking pin 65 is retracted, as shown in Figs. 9 and 10, while when the clutch pin is thrown into engagement with the driving pulley, said locking pin is thrust upwardly into the aperture 66 thereby locking the horn rigidly in position. To accomplish this I have in the present embodiment provided the following mechanism: The lower end of the locking pin 65 is pivotally connected to a lever 69 which is pivoted to the standard 11 at 70, said lever being acted upon by a suitable spring 71 which is secured at one end to the lever 42. Said spring 71, therefore, tends normally to throw the locking pin upward. Pivoted to the end of the lever 69 is a rod or link 72, the upper end of which is pivoted to a rocker 73 that in turn is pivoted to the frame at 74. This rocker 73 has an arm 75 which is provided with a bevel surface 76 and which is adapted to be acted on by the bevel nose 77 of the clutch pin 33 when said clutch pin is disengaged from the driving pulley.

When the machine is at rest, the gear 34 is in the position shown in Figs. 11 and 12 and the clutch pin 33 is retracted, so that the bevel nose 77 thereof projects beyond the face of the gear 34 and is in position to engage the arm 75. The engagement of this nose 77 with the arm 75 turns the rocker 73 thereby drawing upwardly on the rod 72, such upward movement of the rod 72 causing the locking pin to be withdrawn, as shown in Fig. 9. As soon as the treadle is depressed thereby to swing the wedge finger 38 out of engagement with the clutch pin, the spring 36 will come into play to project said pin to the right, Figs. 11 and 12, into one of the apertures 35 in the driving pulley. This movement of the clutch pin will withdraw the nose 77 from beneath the arm 75 of the rocker 73 and permit the spring 71 to shoot the locking pin 65 upwardly into the recess 66, thus locking the horn firmly in its operative position. It will thus be seen that the locking of the horn is not accomplished directly by the action of the treadle, but is instead controlled by the clutch on the main shaft. The advantage of this construction is that the horn is positively locked during the entire time that the clutch is engaged.

It is often desirable to be able to turn the machine by hand through one or more cycle of operations and to be able to operate the treadle during this time without clutching the driving pulley to the main shaft. My invention, therefore, includes a novel manually-controlled device for locking the clutch pin 33 disengaged from the driving to enter said recess and lock the work support in position, and means actuated by the clutch to withdraw said pin.

7. In a machine for inserting fastenings, the combination with fastening-inserting mechanism and a clutch for operating said mechanism, of a tipping work support having a recess, a locking pin to enter said recess, automatically-operative means to move the pin into the recess thereby to lock the work support when the clutch is in clutching engagement, and means actuated by the clutch when it is disengaged to withdraw said pin.

8. In a machine for inserting fastenings, the combination with fastening-inserting mechanism, a main shaft for driving said mechanism, a driving pulley thereon, and a clutch pin for connecting said driving pulley to the main shaft, of a movable work support, and means controlled by the clutch pin for locking the work support in operative position.

9. In a machine for inserting fastenings, the combination with fastening-inserting mechanism, a main shaft for operating the same, a driving pulley thereon, and a clutch pin for clutching said driving pulley to the main shaft, of a horn movable into and out of operative position, a lock to hold the horn in operative position, and means actuated by the clutch pin to operate said lock.

10. In a machine for inserting fastenings, the combination with fastening-inserting mechanism, a main shaft for operating the same, a driving pulley thereon, and a clutch pin for clutching said driving pulley to the main shaft, of a horn movable into and out of operative position, a lock to hold the horn in operative position, and means actuated by said clutch pin upon its disengaging movement to withdraw the lock.

11. In a machine for inserting fastenings, the combination with fastening-inserting mechanism, a main shaft for operating the same, a driving pulley thereon, and a clutch pin for clutching said driving pulley to the main shaft, of a horn movable into and out of operative position, a locking pin to hold the horn in operative position, automatically-operative means to throw the locking pin into locking engagement with the horn, and means actuated by the disengaging movement of the clutch pin to release the lock.

12. In a machine for inserting fastenings, the combination with fastening-inserting mechanism, a shaft for operating the same, a driving pulley thereon, and a clutch pin for clutching the driving pulley to the shaft, of a movable work support, a lock therefor, means actuated by said clutch pin upon its disengaging movement to release the lock, and manually-controlled means to lock the clutch pin in its disengaged position.

13. In a machine for inserting fastenings, the combination with a driver-bar, of a driver-bar guide supported to move up and down when the machine is in operation, means for adjusting said guide and means to reciprocate said driver-bar in the driver-bar guide.

14. In a machine for inserting fastenings, the combination with wire-feeding mechanism including a vertically movable apron, of a driver-bar guide adjustably secured to said apron, a driver-bar within said guide, and operating mechanism therefor.

15. In a machine for inserting fastenings, the combination with a support for a driver-bar guide, of said driver-bar guide, a pin sustained in said support, said pin having an eccentric portion extending into the driver-bar guide whereby the latter can be adjusted by turning said pin.

16. In a machine for inserting fastenings, the combination with a suitable support having ways, of fastening-inserting mechanism sustained thereby, an awl, an awl bar, means to operate said awl bar, a cam plate for guiding the awl bar, said cam plate having a rib received in said ways, and a clamping screw for securing the cam plate in adjusted position.

17. In a machine for inserting fastenings, the combination with wire-feeding mechanism including a lever 90 having a cam surface formed on the end thereof, of a feed bar and an actuating lever 86 for operating the feed bar, said lever having a cam surface formed thereon to coact directly with that of the lever 90 whereby the movement of the lever 90 rocks the lever 86.

18. In a machine for inserting fastenings, the combination with wire-feeding mechanism including a lever 90 having a cam surface formed on the end thereof, of a feed bar, an actuating lever 86 having a cam surface to directly engage and be actuated by the cam surface of the lever 90, and an adjusting screw carried by the said lever 86 and engaging the feed bar.

19. In a machine for inserting fastenings, the combination, with a driver-bar, a driver-bar guide, and means for raising and lowering said driver-bar guide in a substantially vertical path, of an awl, an awl-bar, and mechanism for actuating said awl bar to move said awl into substantial alinement with said driver-bar when said driver-bar guide is raised and to actuate said awl to penetrate the stock.

In testimony whereof, I have signed my name to this specification, in the presence of two subscribing witnesses.

THOMAS G. PLANT.

Witnesses:
ELISHA M. STEVENS,
AMELIA M. ROSS.